United States Patent [19]
Conway

[11] Patent Number: 5,410,333
[45] Date of Patent: Apr. 25, 1995

[54] COMPUTER KEYBOARD

[76] Inventor: Kevin M. Conway, 130 Walnut Ct., Santa Rosa, Calif. 95404

[21] Appl. No.: 151,509

[22] Filed: Nov. 12, 1993

Related U.S. Application Data

[63] Continuation-in-part of Ser. No. 905,019, Jun. 26, 1992, abandoned, which is a continuation-in-part of Ser. No. 853,329, Mar. 18, 1992, Pat. No. Des. 347,423.

[51] Int. Cl.⁶ .............................................. G09G 3/02
[52] U.S. Cl. ..................................... 345/169; 345/168
[58] Field of Search ................... 345/168, 169; 341/22, 341/20; 364/708.1, 709; 400/485, 488–490, 493, 492, 495, 496, 479, 715, 494, 82, 703, 713

[56] References Cited

U.S. PATENT DOCUMENTS

| | | | |
|---|---|---|---|
| 3,884,342 | 5/1975 | Mulholland | 400/690.1 |
| 3,990,565 | 11/1976 | Felton | 400/489 |
| 4,324,976 | 4/1982 | Lapeyre | 341/22 |
| 4,597,681 | 7/1986 | Hodges | 400/488 |
| 4,661,005 | 4/1987 | Lahr | 400/489 |
| 4,808,017 | 2/1989 | Sherman et al. | 400/83 |
| 4,971,465 | 11/1990 | Hashimoto | 400/485 |
| 5,017,030 | 5/1991 | Crews | 400/485 |
| 5,067,834 | 11/1991 | Szmanda et al. | 400/489 |
| 5,119,078 | 6/1992 | Grant | 340/711 |
| 5,122,786 | 6/1992 | Rader | 341/22 |

FOREIGN PATENT DOCUMENTS

| | | | |
|---|---|---|---|
| 487101 | 6/1918 | France | 341/22 |
| 3381227 | 11/1984 | Germany . | |
| 3436189 | 5/1985 | Germany . | |

OTHER PUBLICATIONS

IBM Technical Disclosure Bulletin, vol. 26, No. 11, Apr. 1984, pp. 5826–5827, "Hand–Held Data Input Device".
IMB Technical Disclosure Bulletin, vol. 27, No. 10A, Mar. 1985, pp. 5643–5645, "Keyboard For Handheld Computer".
IBM Technical Disclosure Bulletin, vol. 29, No. 7, Dec. 1986, p. 3110.
"Reinventing the Keyboard", Valley Times, May 4, 1992.
"Twiddler" by Handkey Corp. (advertisement in Mar. 1992 BYTE magazine).
Apple Computer Split Keyboard, In Marin Independent Journal, Jan. 7, 1993.
Vertical Keyboard–photograph.
Maltron Keyboard–advertisement.
Various keyboards–"Comfort", Datahand, Apple Adjustable, Vertical Kinesis, Tony and FlexPro –one page.
The "Twiddler"–three pages.
"ErgoLogic"–advertisement–one page.
"Health Care" keyboard–advertisement–one page.
"The Bat"–photograph–one page.
"Kinesis"–advertisement–one page.
Various keyboards–"Wave", Data Egg, Twiddler, Ullman and Maltron–one page.
U.S. Department of Labor, Bureau of Labor Statistics, information relating to Disorders Associated With Repeated Trauma (1982–1991)–seven pages.
Occupational Safety and Health Administration general industry ergonomics program management recommendations (see, "Working Posture and Work Position", p. 31)–ninety-five pages.

*Primary Examiner*—Alvin E. Oberley
*Assistant Examiner*—Minsun Oh
*Attorney, Agent, or Firm*—Marshall, O'Toole, Gerstein, Murray & Borun

[57] ABSTRACT

An ergonomic computer keyboard. The computer keyboard includes two keyboard portions having keyboard keys disposed on at least two surfaces of one keyboard portion (e.g., a top side and a bottom side) and on at least one surface of the other keyboard portion (e.g., a top side). The keyboard portions are positionable for operation between a user's fingers and thumb, are interconnected, are positionally adjustable with respect to each other and are mountable on a support mechanism for operation off of a working surface.

31 Claims, 8 Drawing Sheets

COMPUTER KEYBOARD

This application is a continuation-in-part of application Ser. No. 07/905,019, filed Jun. 26, 1992, now abandoned, which is a continuation-in-part of application Ser. No. 7/853,329, filed Mar. 18, 1992, now U.S. Pat. No. D347,423. A related application is application Ser. No. 07/905,024, filed Jun. 26, 1992, now U.S. Pat. No. 5,278,779, issued Jan. 11, 1994.

This invention relates to computer keyboards and in particular to an ergonomic computer keyboard structure which is positionable for operation between a user's fingers and thumb and which is supportable for operation above a working surface.

BACKGROUND OF THE INVENTION

Along with the increased use of computers at home and in the workplace, there has been an increase in the number of computer operators who suffer from repetitive stress injuries (RSI) such as carpal tunnel syndrome, wrist and shoulder tendinitis, tennis elbow, neck problems and thoracic outlet syndrome. While considerable efforts have been directed toward providing mechanisms for reducing RSI (e.g., wrist rests, foot stools, mobile arm supports and adjustable chairs), most of those efforts have failed to address the prior computer keyboard as a source of the problem.

Prior computer keyboards commonly include: one flat, generally rectangular, rigid "slab" bearing one hundred or more keys (e.g., standard letter keys in a "QWERTY" configuration or other arrangement, number keys, punctuation keys and function keys) disposed on a top side of that computer keyboard; and a bottom side which serves the limited function of supporting the computer keyboard on a working surface (e.g., a tabletop). Prior computer keyboards are commonly supported on top of the working surface and cannot effectively be positioned away from or operated away from that working surface (i.e., they are "married" to the working surface). Thus, a computer keyboard operator has a limited number of keyboard positions available to adjust such prior keyboards for comfort.

Because many keys are needed to operate a computer (i.e., more than just standard letter keys), prior computer keyboards are necessarily relatively large and, therefore, are clumsy. A computer keyboard operator cannot readily vary the position of such large, slab computer keyboards.

Some prior computer keyboards include two keyboard halves (a split keyboard), which can be varied in position with respect to each other, and keyboard keys which are disposed on the top sides of those keyboard halves. Such prior keyboard halves include bottom sides which are supported on a working surface or a fixed base or which are integral with a computer. Generally, a computer keyboard operator cannot position such keyboard halves far away from the working surface, fixed base or computer. While this prior split keyboard enables a computer keyboard operator to position the keyboard in a greater number of positions than are available with a one-piece, slab keyboard, because of the proximity of the split keyboard to the working surface, fixed base or computer, the number of positions available to the computer keyboard operator is still limited. Additionally, access to the bottom sides of such prior split keyboards is limited or virtually impossible.

Given the general inconvenience in repositioning prior computer keyboards and the limited number of positions for using prior computer keyboards, computer keyboard operators commonly operate such computer keyboards without regularly changing either the keyboard position or their body position or posture. Long-term use of these prior keyboards without periodic changes in keyboard position or body position causes static loading from the elbows to the spine of the computer keyboard operator. Such static posturing can be awkward and uncomfortable and puts the computer keyboard operator at risk for developing RSI. One of the key factors in good ergonomic design is to enable a computer keyboard operator to assume a variety of body positions or postures. It is, therefore, desirable to have a computer keyboard which can be easily positioned in numerous positions and which, in turn, enables a computer keyboard operator to readily assume a variety of body positions while operating the computer keyboard (e.g., upright sitting, sitting cross-legged, reclined sitting, kneel/sitting, standing upright or walking).

Miniaturization of computer hardware also is an important factor in the development of computers and computer keyboards. Some smaller-sized prior computer keyboards include letter keyboard keys (switches) which have multiple functions. However, such multi-function keys are complex to use. Other smaller-sized prior computer keyboards include significantly smaller-than-standard letter keyboard keys. However, such smaller-than-standard letter keys are tiresome to use. It is, therefore desirable to have a computer keyboard which is smaller-sized but includes standard-sized, single-function letter keys.

SUMMARY OF THE INVENTION

There is provided in accordance with the present invention an improved ergonomic computer keyboard. More particularly, the computer keyboard of the present invention includes two keyboard portions having keyboard keys disposed on at least two surfaces of one keyboard portion (e.g., opposing sides or adjacent sides) and on at least one surface of the other keyboard portion, means for connecting the keyboard portions to enable positional adjustment of the keyboard portions with respect to each other, and means for operating the keyboard above a working surface, including means for mounting the keyboard portions on a support mechanism.

The positionally adjustable computer keyboard of the present invention is mountable on a spring balanced adjustable arm, a neck strap or other appropriate support mechanism and is operated above or off of a working surface i.e., "off the table". Such off the table operation of the computer keyboard combined with the positional adjustability of the keyboard portions enables the computer keyboard operator to position the computer keyboard portions with respect to each other in a multitude of configurations. Thus, the computer keyboard operator can regularly assume numerous different body positions (e.g., upright sitting, reclined sitting, kneel/sitting, standing or walking) and can adjust the computer keyboard to be comfortably operated from each body position. Such periodic change of body position enables the computer keyboard operator to eliminate the problems associated with prolonged, static posturing and reduces the risk of RSI. The computer keyboard operator may be alerted by a timed beeper to change body position and keyboard position.

Additionally, the combination of the positional adjustability of and the off the table operation of the computer keyboard of the present invention computer keyboard gives the computer keyboard operator access to all of the surfaces of the computer keyboard portions. Thus, all of the surfaces of the computer keyboard of the present invention are available for key placement. Thus, the computer keyboard can include standard-sized, single-function letter keyboard keys yet the computer keyboard itself can be miniaturized.

Moreover, when the keyboard keys of the present invention are placed on adjacent or opposing surfaces of a computer keyboard portion, the keys on one surface of that keyboard portion are accessible for use by the fingers of the computer keyboard operator and the keys on the adjacent or opposing surface of that keyboard portion are accessible for use by the thumb of the computer keyboard operator. Thus, the computer keyboard of the present invention enables the computer keyboard operator to make the best use of the thumb in operating the keyboard. This is advantageous because the thumb is the most flexible digit and has the most muscle support.

Additionally, because of the variability of key placement and because the computer keyboard portions can be arranged in a multitude of positions relative to each other, the computer keyboard is particularly suitable for use by a disabled computer keyboard operator. For example, a computer keyboard operator who has partial use or no use of one of two upper extremities (and who might have great difficulty in operating prior keyboards) can position the computer keyboard portions of the present invention to enable comfortable operation of the keyboard keys.

The computer keyboard portions of the present invention may be positioned so that the keyboard keys located on certain surfaces of the keyboard portions may not be in plain view to the computer keyboard operator. To enable a computer keyboard operator to more readily identify specific keys, some of the keyboard keys may be differentiated by texture, contour, shape, or other features.

The computer keyboard of the present invention may be used in parallel with an existing keyboard. Such parallel use requires the addition of a keyboard interface. However, the computer keyboard of the present invention may be used as a stand alone, replacement keyboard.

In one aspect of the present invention, the computer keyboard utilizes a standard "QWERTY" keyboard key arrangement with the right-hand QWERTY keys disposed on one of the surfaces of one keyboard portion and the left-hand QWERTY keys disposed on one of the surfaces of the other keyboard portion. Non-QWERTY keys may be disposed on the surfaces having QWERTY keys as well as on the other surfaces of the keyboard portions.

In another aspect of the present invention, the means for connecting the computer keyboard portions includes two stackable hinges, each of which is coupled to a keyboard portion for positional adjustment of that keyboard portion with respect to the other keyboard portion. The means for connecting the computer keyboard portions also includes: two connecting rods, each of which interconnects a keyboard portion and a stackable hinge; and an interconnecting member interconnecting the stackable hinges. This embodiment of the present invention also includes mounting means further including a clamping means coupled to the keyboard portions to mount the computer keyboard on a support mechanism for operation of the keyboard off of a working surface.

In another aspect of the invention, the computer keyboard portions have keyboard keys disposed on their top sides and one keyboard portion has at least one keyboard key disposed on a side surface adjacent the top side.

In another aspect of the invention, the computer keyboard is in the form of a book and includes a right hand and a left hand pair of keyboard portions or halves and a connecting means joining the keyboard portions together in a non-planar (V-shaped or open-book shaped) arrangement along a common edge. Each keyboard portion of this book type keyboard has a front side, a back side and a top edge, with the angular relationship between the two keyboard halves defining a pair of inside surfaces on the back sides (with the contained angle between the two inside surfaces being less than 180 degrees) and a pair of outside surfaces on the front sides (with the relative angle between the two outside surfaces being greater than 180 degrees). Both sides of each keyboard half preferably contain at least one key or input control, such that the entire desired array of keys is disposed about the four surfaces (i.e., two front sides and two back sides) and/or top edges of the keyboard portions. The computer keyboard operator may place the thumb and fingers of each hand on the right-hand and left-hand portions of the computer keyboard, as if reading an open book, such that the keys on the front sides/outside surfaces and top edges of the keyboard halves are accessible to the computer keyboard operator's fingers and the keys on the back sides/inside surfaces and side edges of the keyboard halves are accessible to the computer keyboard operator's thumbs. A computer keyboard in the open-book configuration may be supported during operation by a neck strap depending from the operator, or may be supported directly on a computer keyboard operator's lap, a table or workstation surface.

In another aspect of the present invention, the connecting means comprises a movable hinge member enabling adjustment of the angular relationship between the keyboard portions. However, the connecting means joining the two keyboard portions of the present invention may be a static feature permanently orienting the keyboard portions in a fixed angular relationship.

In another aspect of the invention, the computer keyboard includes an on/off switch for turning off (deactivating) the computer keyboard before the computer keyboard operator repositions the computer keyboard portions.

BRIEF DESCRIPTION OF THE DRAWING

The above and other objects and advantages and novel features of the present invention will become apparent from the following detailed description of the invention illustrated in the accompanying drawing wherein.

DETAILED DESCRIPTION OF THE INVENTION

Figure 1:
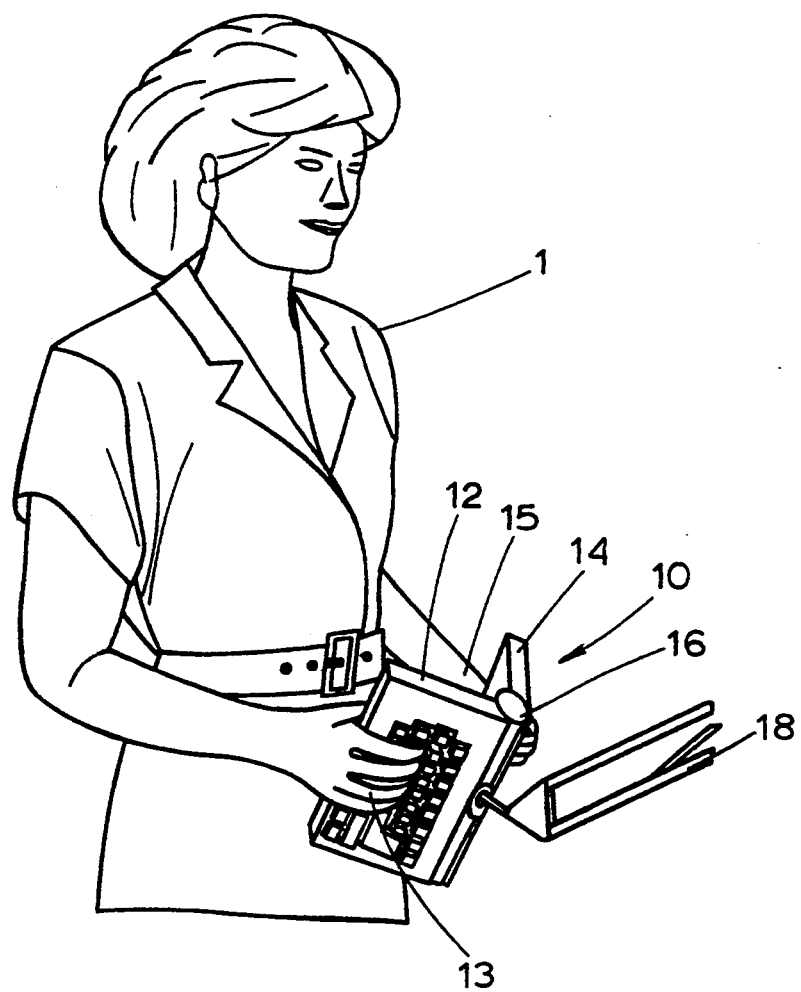
FIG. 1 is a pictorial view of a book type computer keyboard constructed in accordance with the principles of the present invention and mounted on a support arm.

FIG. 1 is a pictorial view of a new and improved computer keyboard 10 constructed in accordance with the principles of the present invention. Keyboard 10 includes a first computer keyboard portion 12 and a second computer keyboard portion 14. Keyboard 10 also includes a hinge 16 which connects keyboard portions 12 and 14 and enables a computer keyboard operator 1 to positionally adjust keyboard portions 12 and 14 with respect to each other. A support arm 18 is attached to hinge 16 and suspends keyboard 10 in space (i.e., keyboard 10 is not resting on a tabletop or other working surface). FIG. 1 shows keyboard portions 12 and 14 positioned with respect to each other in an open-book configuration. Keyboard portion 12 is disposed between the thumb and fingers of the right hand 13 of operator 1 and keyboard portion 14 is disposed between the thumb and fingers of the left hand 15 of operator 1.

Figure 2:
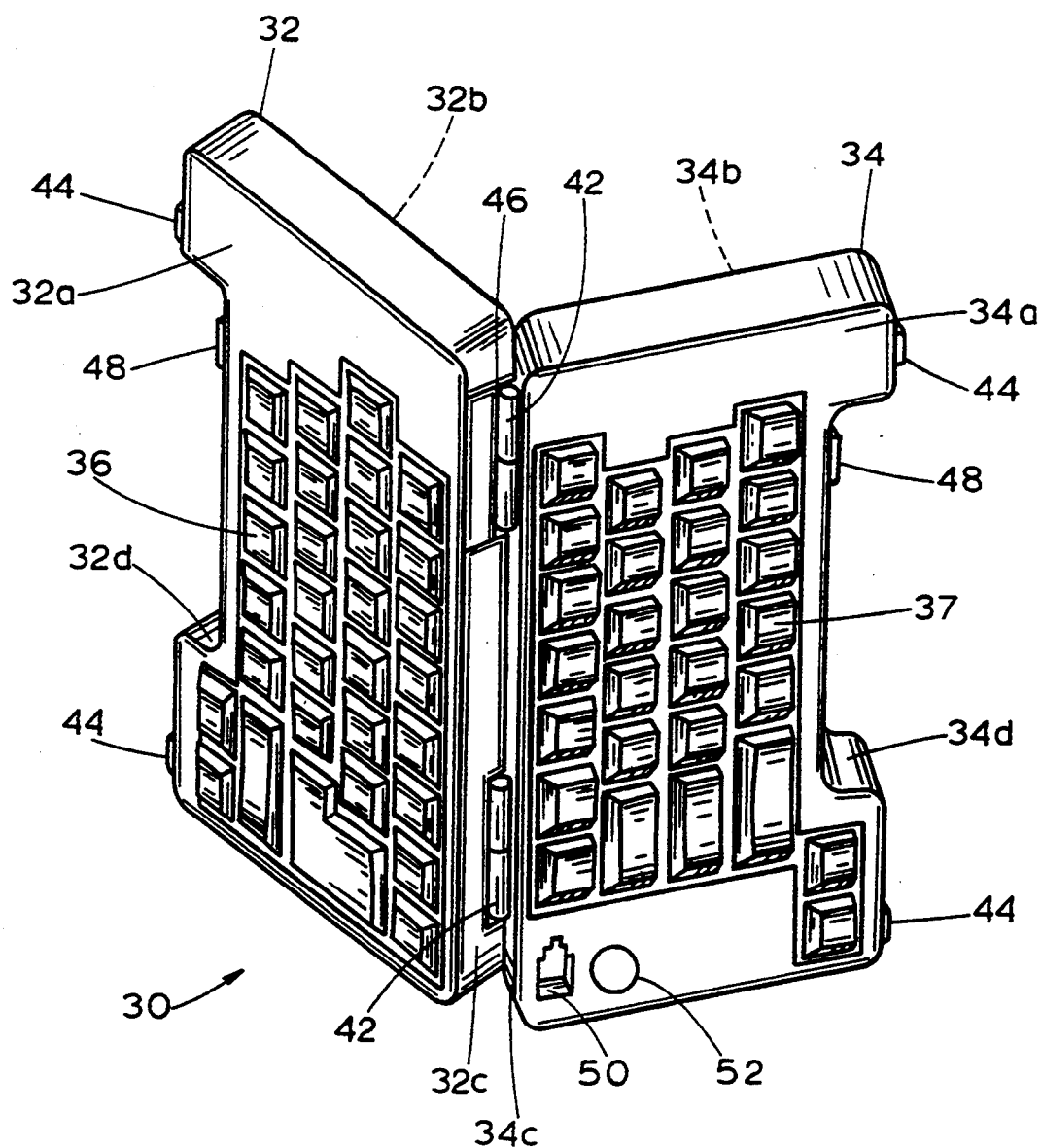
FIG. 2 is a perspective view of a computer keyboard of the book type configuration of FIG. 1 constructed in accordance with the principles of the present invention.
Figure 3:
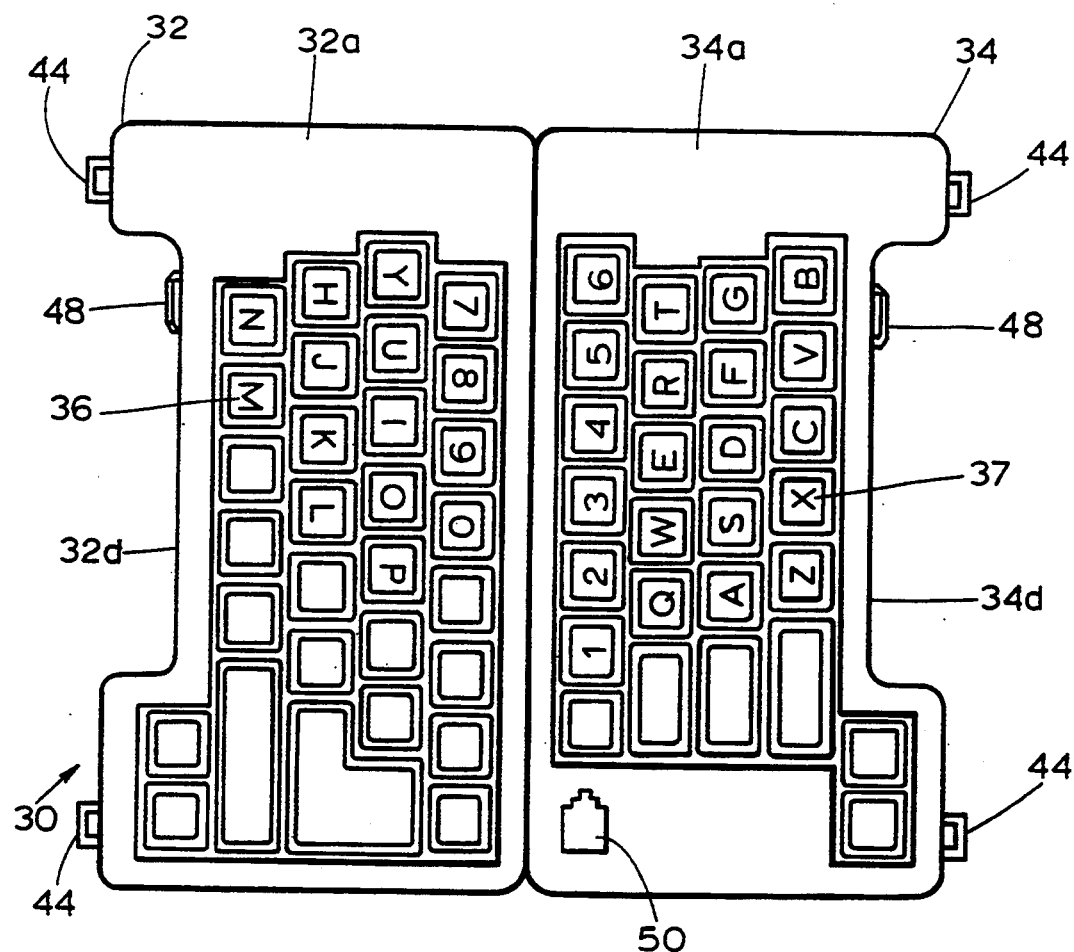
FIG. 3 is an elevational view of the front sides/outside surfaces of the computer keyboard of FIG. 2 in a flattened (planar) configuration.
Figure 4:
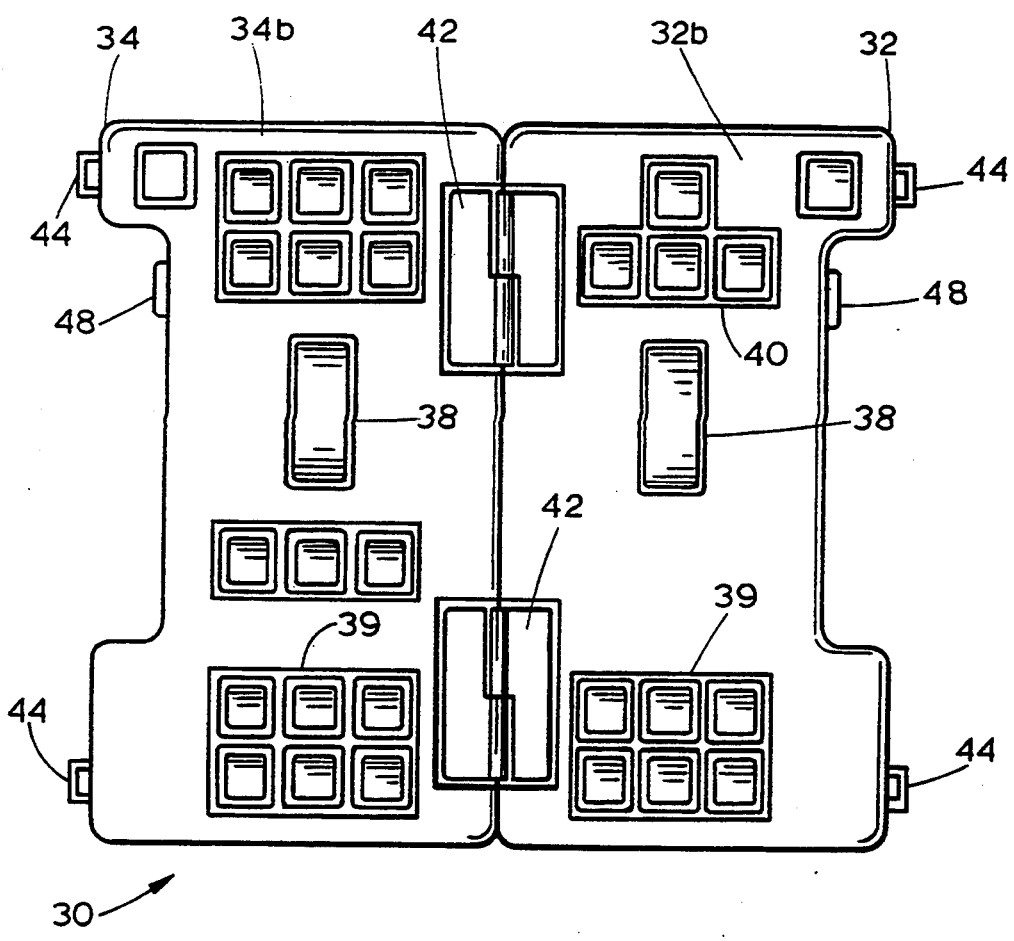
FIG. 4 is an elevational view of the back sides/inside surfaces of the computer keyboard of FIG. 2 in a flattened configuration.

FIGS. 2, 3 and 4 illustrate a new and improved computer keyboard 30 constructed in accordance with the principles of the present invention. The keyboard 30 (FIG. 2) includes computer keyboard portions 32 and 34 each having front sides 32a and 34a, respectively, back sides 32b and 34b, respectively, connecting edges 32c and 34c, respectively, perimeter edges 32d and 34d, respectively, an array of keys 36 and 37 disposed about front sides 32a and 34a, respectively, and an array of keys 38, 39 and 40 disposed about back sides 32b and 34b (FIG. 4).

Connecting edges 32c and 34c are joined together by hinges 42 (FIG. 2). Hinges 42 enable a computer keyboard operator to positionally adjust keyboard portions 32 and 34 with respect to each other such that keys 36 and 37 are accessible to the fingers of a computer keyboard operator and keys 38, 39 and 40 are accessible to the thumbs of the operator when the keyboard 30 is positioned for operation between the operator's fingers and thumb. FIG. 2 illustrates keyboard portions 32 and 34 positioned with respect to each other in an open-book shape or configuration. When keyboard portions 32 and 34 are positioned in the open-book configuration, the wrists and forearms of a computer keyboard operator are in an optimal, neutral "hand-shake" position and the computer keyboard operator is able to assume a comfortable posture which relieves stress to the neck, back, shoulders, arms, wrists and hands.

Keyboard 30 includes strap connectors 44 disposed along perimeter edges 32d and 34d of keyboard portions 32 and 34, respectively, and, mounting surface 46 disposed along connecting edge 32c of keyboard portion 32 (FIG. 2). A neck strap can be attached to neck strap connectors 44 or a support arm or other support mechanism can be attached to mounting surface 46 for operation of keyboard 30 in space, i.e. off of a tabletop or other working surface.

Other keys, such as space bar keys 48, cursor keys, etc. may be placed on perimeter edges 32d and 34d of keyboard portions 32 and 34.

Front sides 32a and 34a of keyboard portions 32 and 34, respectively, may also contain keyboard/CPU cord jack 50 and/or wireless transmit/receive port 52 (FIG. 2).

FIG. 3 illustrates front sides 32a and 34a of computer keyboard portions 32 and 34, respectively, of computer keyboard 30 positioned in a flattened (planar) configuration. Front side 32a of keyboard portion 32 includes conventional right-hand QWERTY keys 36 and front side 34a of keyboard portion 34 includes conventional left-hand QWERTY keys 37 (one possible key placement array). Key placement may be adjusted for easier access, e.g., in a curved pattern. Also, key functions could be programmed at the keyboard level.

FIG. 4 illustrates back sides 32b and 34b of computer keyboard portions 32 and 34, respectively, of computer keyboard 30 positioned in a flattened (planar) configuration. This view illustrates one possible key placement array including space bar keys 38 disposed on back sides 32b and 34b, function keys 39 disposed on back sides 32b and 34b, arrow keys 40 disposed on back side 32b and other appropriate keys.

Figure 5:
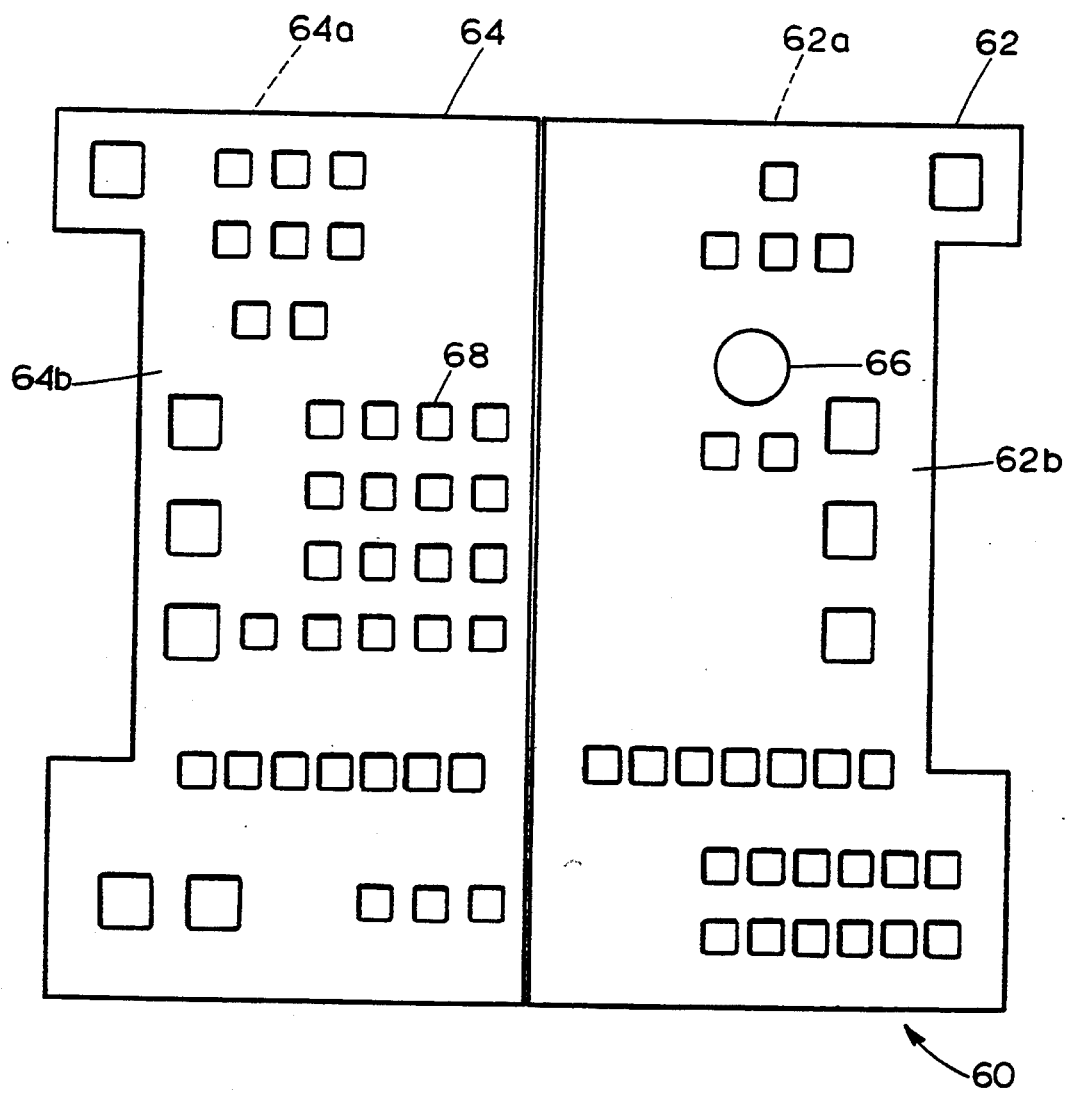
FIG. 5 is an elevational view of the back sides/inside surfaces of a computer keyboard constructed in accordance with the principles of the present invention having a key arrangement including a trackball/mouse control and number pad section.

FIG. 5 illustrates a new and improved computer keyboard 60 constructed in accordance with the principles of the present invention. Keyboard 60 includes computer keyboard portions 62 and 64 each having front sides 62a and 64a, respectively, and back sides 62b and 64b, respectively. Disposed about back side 62b is a trackball/mouse control 66 and disposed about back side 64b is a number pad section 68. Keyboard portions 62 and 64 can be positioned so that front sides 62a and 64a are accessible to the fingers of the computer keyboard operator and trackball/mouse control 66 and number pad section 68 are accessible to the thumbs of the operator. The usefulness of trackball 66 is greatly enhanced by this inventive keyboard in that keyboard portion 62 may be positioned in a vertical plane so that movement of the operator's thumb corresponds to the movement of the cursor on the computer screen (i.e., thumb movement upwards causes cursor movement upwards). The keyboard surfaces may also incorporate a pen-based input surface or any other input control.

Figure 6:
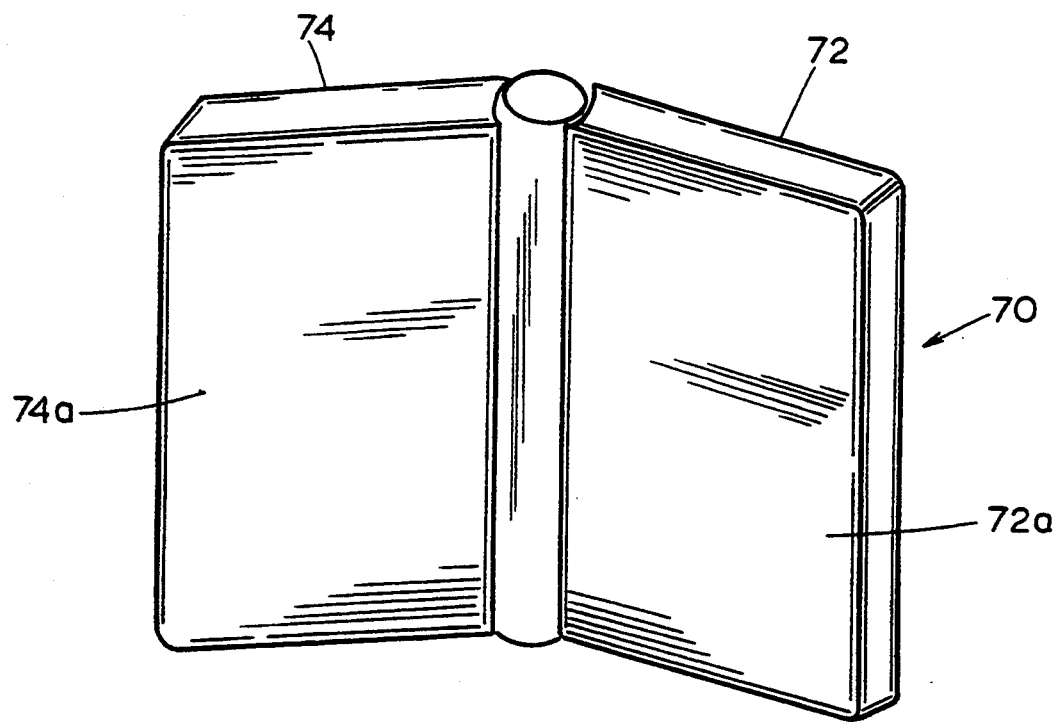
FIG. 6 is a perspective view of a computer keyboard constructed in accordance with the principles of the present invention having fixed-angle (non-hinging) keyboard portions.

FIG. 6 illustrates a new and improved computer keyboard 70 constructed in accordance with the principles of the present invention. Keyboard 70 includes keyboard halves 72 and 74 having back sides 72a and 74a, respectively. Keyboard halves 72 and 74 are fixed in a permanent angular relationship to each other, i.e., they are not movable by a hinge or other such connecting member. In one possible configuration there is a 135 degree angle between back side 72a and back side 74a.

Figure 7:
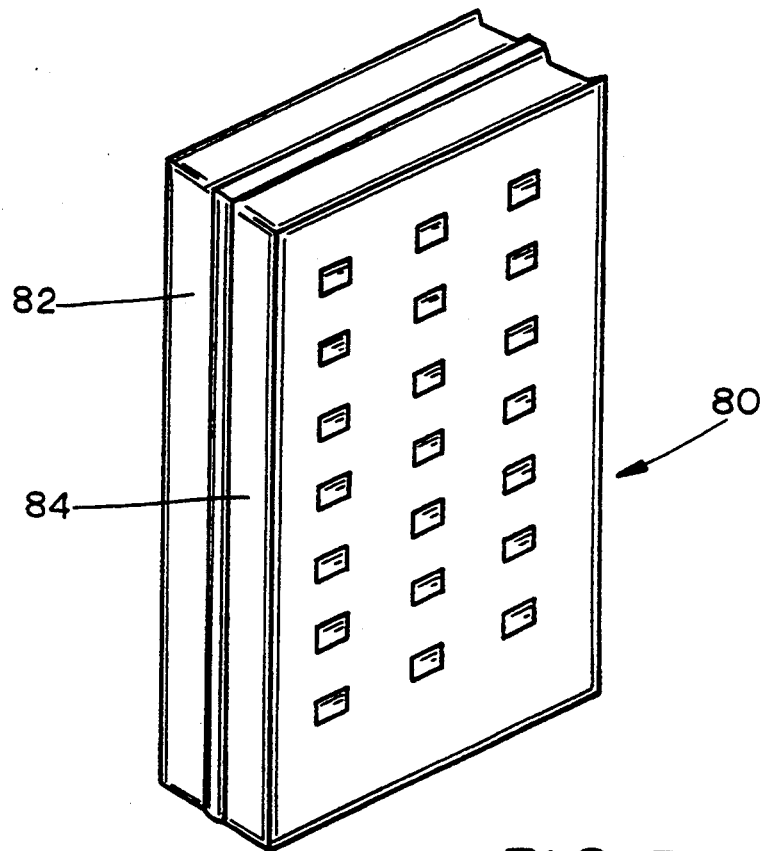
FIG. 7 is a perspective view of a computer keyboard constructed in accordance with the principles of the present invention having variable-angle (hinging) keyboard portions which are positioned in a closed configuration for storage and/or transport.

FIG. 7 illustrates a new and improved computer keyboard 80 constructed in accordance with the principles of the present invention. Keyboard 80 includes keyboard halves 82 and 84. Keyboard halves 82 and 84 are movable with respect to each other by a hinge or other such connecting member. FIG. 7 illustrates keyboard 80 in a folded or closed configuration for storage and/or transport. This folded configuration not only saves space, but enables the keyboard to be placed vertically on a table or shelf when not in use.

Figure 8:
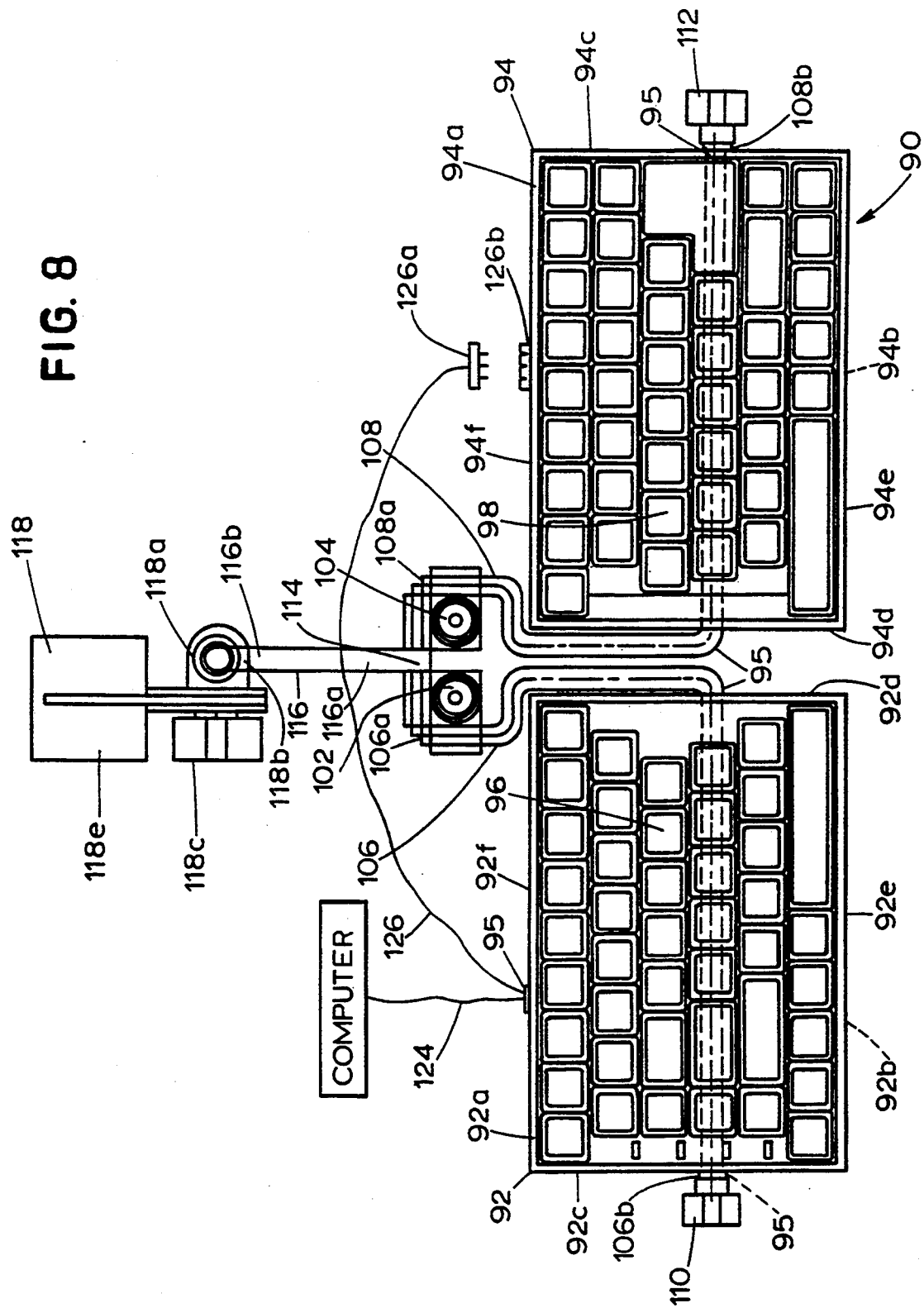
FIG. 8 is a top plan view of a preferred embodiment of a computer keyboard constructed in accordance with the principles of the present invention.
Figure 9:
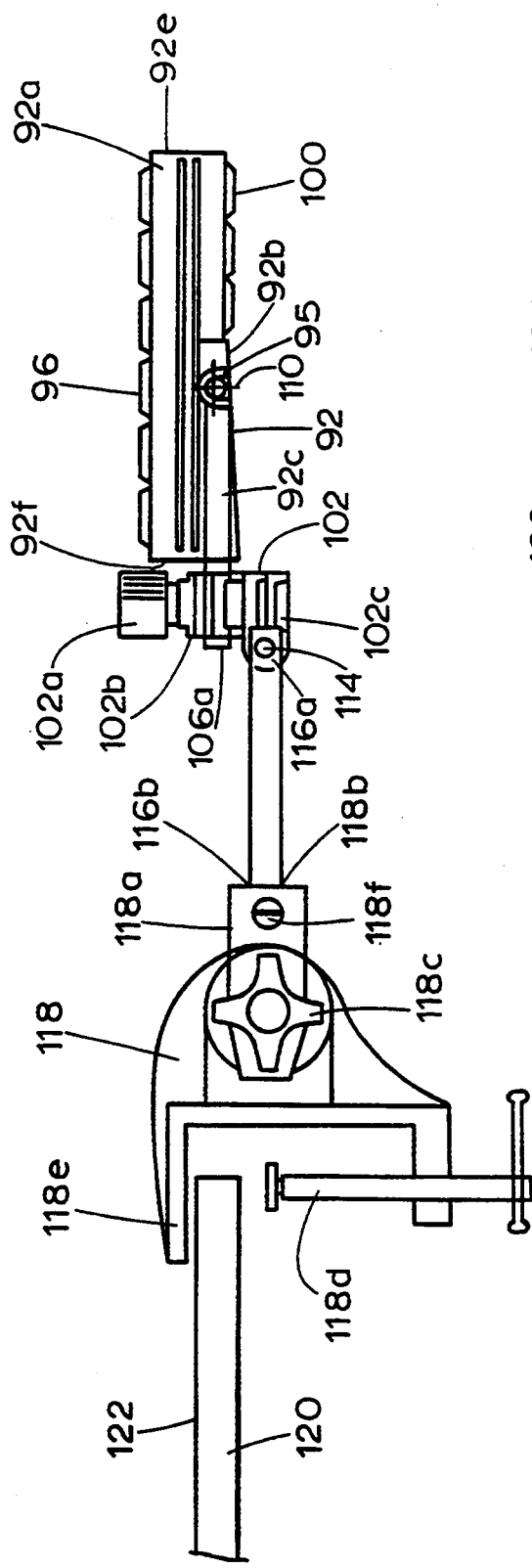
FIG. 9 is a side elevational view of the computer keyboard of FIG. 8.

FIGS. 8 and 9 illustrate a preferred embodiment of a new and improved computer keyboard 90 constructed in accordance with the principles of the present invention. Keyboard 90 includes computer keyboard portions 92 and 94 which may be constructed of aluminum, injection molded plastic or other suitable material. Keyboard portions 92 and 94 each include top sides 92a and 94a, respectively, bottom sides 92b and 94b, respectively, outside sides 92c and 94c, respectively, inside sides 92d and 94d, respectively, front sides 92e and 94e, respectively, and back sides 92f and 94f, respectively.

In the embodiment illustrated in FIGS. 8 and 9: outside sides 92c and 94c of keyboard portions 92 and 94, respectively, and inside sides 92d and 94d of keyboard portions 92 and 94, respectively, are 4.8 inches in length; front sides 92e and 94e of keyboard portions 92 and 94, respectively, and back sides 92f and 94f of keyboard portions 92 and 94, respectively, are 7.1 inches in length; front sides 92e and 94e are 1.0 inch in height; and back sides 92f and 94f are 1.3 inches in height. Outside sides 92c, 94c, inside sides 92d, 94d and back side 92f each include a hole 95 disposed therethrough (FIG. 9).

Disposed about top side 92a are standard-sized 18 mm (eighteen millimeter) letter keys 96 which include the left-hand keys of a conventional QWERTY key configuration, i.e., left-handed QWERTY keys. Disposed about top side 94a are standard-sized 18 mm (eighteen millimeter) letter keys 98 which include the right-hand keys of a conventional QWERTY key configuration, i.e., right-handed QWERTY keys. Disposed about bottom sides 92b and 94b are 15 mm (fifteen millimeter) non-letter keyboard keys 100 (FIG. 9). FIGS. 8 and 9 illustrate one possible arrangement of keyboard keys.

Keyboard 90 includes stackable hinges 102 and 104 which enable positional adjustment of keyboard portions 92 and 94, respectively, with respect to each other. By operating stackable hinges 102 and 104, a computer keyboard operator can positionally adjust keyboard portions 92 and 94 and have optimum access to keys 96 and 98 disposed on top sides 92a and 94a, respectively, and have optimum access to bottom keys 100 disposed on said bottom sides 92b and 94b when the keyboard is positioned for operation between the operator's fingers and thumb.

Stackable hinges 102 and 104 include stackable hinge knobs 102a and 104a, respectively, top hinge parts 102b and 104b, respectively, and bottom hinge parts 102c and 104c, respectively (FIG. 9). Stackable hinges such as stackable hinges 102 and 104 are commercially available items for positioning photographic equipment.

Keyboard 90 includes connecting rods 106 and 108 having first ends 106a and 108a, respectively, and second ends 106b and 108b, respectively (FIG. 8). First end 106a of connecting rod 106 is attached to top hinge part 102b of stackable hinge 102 and is extended through hole 95 in inside side 92d and through hole 95 in outside side 92c. First end 108a of connecting rod 108 is attached to top hinge part 104b of stackable hinge 104 and is extended through hole 95 in inside side 94d and through hole 95 in outside side 94c. Connecting rods 106 and 108 are made of ¼ inch diameter round stock. If first ends 106a and 108a do not have a large enough diameter to fit snugly into top hinge parts 102b and 104b, respectively, of stackable hinges 102 and 104, respectively, a sleeve or other adapter can be inserted in between first ends 106a and 108a and top hinge parts 102b and 104b, respectively.

Keyboard 90 includes securing knobs 110 and 112 which are screwed onto second ends 106b and 108b, respectively, of connecting rods 106 and 108, respectively. By rotating securing knobs 110 and 112 towards keyboard portions 92 and 94, respectively, keyboard portions 92 and 94 are secured on connecting rods 106 and 108, respectively.

Keyboard 90 includes interconnecting member 114 for joining bottom hinge 102c of stackable hinge 102 to bottom hinge 104c of stackable hinge 104. In the embodiment illustrated in FIGS. 7 and 8, interconnecting member 114 is 2 (two) inches in length.

Keyboard 90 includes clamping means 115 (FIG. 9) having an extension 116 which includes a first end 116a and a second end 116b which has a "flat" on it. First end 116a of extension 116 is centrally attached to and is perpendicular to interconnecting member 114. In the embodiment illustrated in FIGS. 7 and 8, extension 116 is 4 (four) inches in length and is integrally formed with interconnecting member 114 in a "t-bar" shape. The t-bar is made from ⅜ inch diameter round stock.

Clamping means 115 of keyboard 90 includes a commercially available "swivel" C-clamp 118. C-clamp 118 includes a swivel socket 118a having a recess 118b, a clamping knob/bolt 118c, a clamping bar 118d, a C-bracket 118e and a set screw 118f which is disposed on swivel socket 118a and can be adjusted to project into recess 118b.

Second end 116b of extension 116 is inserted ¾ of an inch into recess 118b of swivel socket 118a of C-clamp 118. By rotating set screw 118f of C-clamp 118 towards the "flat" on inserted second end 116b of extension 116, second end 116b of extension 116 can be attached and secured inside recess 118b.

Clamping knob/bolt 118c of C-clamp 118 attaches C-bracket 118e of C-clamp 118 between swivel socket 118a of C-clamp 118 and clamping knob/bolt 118c. C-bracket 118e can be rotated to various positions between swivel socket 118a and clamping knob/bolt 118c to enable positional adjustment of C-clamp 118 with respect to extension 116. When C-clamp 118 is secured to a tabletop or other support mechanism, swivel socket 118a can be rotated to enable positional adjustment of extension 116 with respect to C-clamp 118. Clamping knob/bolt 118c is rotated toward swivel socket 118a to secure C-bracket 118e to swivel socket 118a.

Clamping bar 118d of C-clamp 118 can be rotationally adjusted within C-bracket 118e of C-clamp 118 to enable C-clamp 118 to be secured to a tabletop 120 or other support mechanism. Mounting C-clamp 118 to support mechanism 120 enables computer keyboard 90 to be operated off of a working surface 122.

Keyboard 90 includes a main cord 124 and a connecting cord 126 extending out of hole 95 of back side 92f of keyboard portion 92 (FIG. 8). Main cord 124 interconnects keyboard 90 with a computer. Connecting cord 126 interconnects keyboard portion 92 and keyboard portion 94. Connecting cord 126 is connected to back side 94f of keyboard portion 94 by a 6-pin mini-din connector having a male end 126a which is attached to cord 126 and a female end 126b which is attached to back side 94f.

Figure 10:
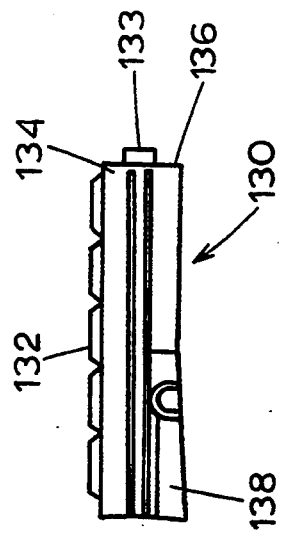
FIG. 10 is a fragmented side elevational view of an alternative embodiment of a computer keyboard constructed in accordance with the principles of the present invention.

FIG. 10 illustrates a new and improved computer keyboard 130 constructed in accordance with the principles of the present invention. Keyboard 130 includes all of the features of computer keyboard 90 (FIGS. 8 and 9) except that keyboard 130 has keyboard keys 132 disposed on a top side 134 and keyboard key 133 on a front side 136 of a keyboard portion 138 and has no keys disposed on the bottom sides of either keyboard portion. In contrast, keyboard portions 92 and 94 of keyboard 90 include keys 96 and 98 disposed on top sides 92a and 94a, respectively, and keys 100 disposed about bottom sides 92b and 94b.

Obviously, many modifications and variations of the present invention are possible in light of the above teachings. Thus, it is to be understood that, within the scope of the appended claims, the invention may be practiced other than is specifically set forth hereinabove.

What is claimed is:

1. A computer keyboard mountable on a support mechanism for operation with respect to a working surface and positionable for operation between a user's fingers and thumb, said computer keyboard comprising:
   a first keyboard portion;
   said first keyboard portion having two opposing sides;
   one of said opposing sides of said first keyboard portion having at least one key;
   said other opposing side of said first keyboard portion having at least one key;
   a second keyboard portion;
   said second keyboard portion having two opposing sides;
   one of said opposing sides of said second keyboard portion having at least one key;
   connecting means interconnecting said keyboard portions to enable positional adjustment of said keyboard portions with respect to each other;
   said connecting means enabling a computer keyboard operator to access said at least one key disposed on one of said opposing sides of said first keyboard portion and to access said at least one key disposed on said other opposing side of said first keyboard portion; and
   mounting means coupled to at least one of said keyboard portions for mounting said keyboard portions on said support mechanism, said mounting means including adjustable positioning means for adjustably positioning said keyboard portions to a plurality of operating positions off of said working surface and for enabling operation of said keyboard portions in at least a selected one of said operating positions.

2. A computer keyboard according to claim 1, wherein said other opposing side of said second keyboard portion includes at least one key disposed on said other opposing side of said second keyboard portion.

3. A computer keyboard according to claim 1, further comprising:
   a surface disposed between said opposing sides of one of said keyboard portions; and
   a key disposed on said surface.

4. A computer keyboard according to claim 1, wherein said connecting means includes a hinge.

5. A computer keyboard according to claim 1, wherein said keyboard portions are half portions.

6. A computer keyboard according to claim 1, wherein said computer keyboard includes a "QWERTY" keyboard key configuration having left-hand keys, right-hand keys and a space key.

7. A computer keyboard according to claim 6, wherein said left-hand keys are disposed on one of said opposing sides of one of said keyboard portions and said right-hand keys are disposed on one of said opposing sides of said other keyboard portion.

8. A computer keyboard according to claim 6, wherein said space key is disposed on said other opposing side of one of said keyboard portions.

9. A computer keyboard according to claim 1, wherein one of said keyboard portions includes a trackball disposed on one of said keyboard portions.

10. A computer keyboard according to claim 1, wherein said key disposed on said other opposing side of said first keyboard portion is a backspace key.

11. A computer keyboard according to claim 1, wherein one of said keys is an on/off switch.

12. A computer keyboard mountable on a support mechanism for operation with respect to a working surface which includes a "QWERTY" keyboard key configuration having left-hand "QWERTY" keys, right-hand "QWERTY" keys and a space key and which is positionable for operation between a user's fingers and thumb, said computer keyboard comprising:
    first and second keyboard portions;
    each of said keyboard portions having two opposing sides;
    each of said opposing sides of each of said keyboard portions having a plurality of keys;
    one of said opposing sides of said first keyboard portion having said left-hand "QWERTY" keys;
    one of said opposing sides of said second keyboard portion having said right-hand "QWERTY" keys;
    said other opposing side of one of said keyboard portions having said space key;
    connecting means interconnecting said keyboard portions to enable positional adjustment of said keyboard portions with respect to each other;
    said connecting means enabling a computer keyboard operator to access said keys disposed on one of said opposing sides of said first keyboard portion and said keys disposed on said other opposing side of said first keyboard portion and to access said keys disposed on one of said opposing sides of said second keyboard portion and said keys disposed on said other opposing side of said second keyboard portion; and
    mounting means coupled to at least one of said keyboard portions for mounting said keyboard portions on said support mechanism, said mounting means including adjustable positioning means for adjustably positioning said keyboard portions to a plurality of operating positions off of said working surface and for enabling operation of said keyboard portions in at least a selected one of said operating positions.

13. A computer keyboard according to claim 12, wherein said connecting means includes:
    first and second stackable hinges;

said first stackable hinge coupled to said first keyboard portion for positional adjustment of said first keyboard portion with respect to said second keyboard portion; and said second stackable hinge coupled to said second keyboard portion for positional adjustment of said second keyboard portion with respect to said first keyboard portion.

14. A computer keyboard according to claim 13, wherein said connecting means further includes:
first and second connecting rods;
said first connecting rod interconnecting said first keyboard portion and said first stackable hinge; and
said second connecting rod interconnecting said second keyboard portion and said second stackable hinge.

15. A computer keyboard according to claim 14, wherein said connecting means further includes:
an interconnecting member interconnecting said first stackable hinge and said second stackable hinge.

16. A computer keyboard according to claim 15, wherein said mounting means includes a clamping means connected to said interconnecting member.

17. A computer keyboard according to claim 14, wherein said mounting means includes clamping means.

18. A computer keyboard according to claim 17, wherein said clamping means further interconnects said first and second stackable hinges.

19. A computer keyboard according to claim 17, wherein said clamping means includes adjustment means for positional adjustment of said keyboard with respect to said support mechanism.

20. A computer keyboard mountable on a support mechanism for operation with respect to a working surface and positionable for operation between a user's fingers and thumb, said computer keyboard comprising:
a first keyboard portion;
said first keyboard portion having two opposing sides;
one of said opposing sides of said first keyboard portion having at least one key;
said other opposing side of said first keyboard portion having at least one key;
a second keyboard portion;
said second keyboard portion having two opposing sides;
one of said opposing sides of said second keyboard portion having at least one key;
connecting means interconnecting said keyboard portions and enabling a computer keyboard operator to access said at least one key disposed on one of said opposing sides of said first keyboard portion and to access said at least one key disposed on said other opposing side of said first keyboard portion;
said connecting means having first and second stackable hinges;
said first stackable hinge coupled to said first keyboard portion for positional adjustment of said first keyboard portion with respect to said second keyboard portion;
said second stackable hinge coupled to said second keyboard portion for positional adjustment of said second keyboard portion with respect to said first keyboard portion; and
mounting means for mounting said keyboard portions on said support mechanism, said mounting means including adjustable positioning means for adjustably positioning said keyboard portions to a plurality of operating positions off of said working surface and for enabling operation of said keyboard portions in at least a selected one of said operating positions.

21. A computer keyboard mountable on a support mechanism for operation with respect to a working surface and positionable for operation between a user's fingers and thumb, said computer keyboard comprising:
first and second keyboard portions;
each of said keyboard portions having a top side and an adjacent side surface;
each of said keyboard portions having a plurality of keys disposed on said top side;
one of said keyboard portions having at least one key disposed on said adjacent side surface;
connecting means interconnecting said keyboard portions and enabling a computer keyboard operator to access said keys disposed on said top side of one of said keyboard portions and to access said key disposed on said adjacent side surface of that keyboard portion;
said connecting means having first and second stackable hinges;
said first stackable hinge coupled to said first keyboard portion for positional adjustment of said first keyboard portion with respect to said second keyboard portion;
said second stackable hinge coupled to said second keyboard portion for positional adjustment of said second keyboard portion with respect to said first keyboard portion; and
mounting means for mounting said keyboard portions on said support mechanism, said mounting means including adjustable positioning means for adjustably positioning said keyboard portions to a plurality of operating positions off of said working surface and for enabling operation of said keyboard portions in at least a selected one of said operating positions.

22. A computer keyboard according to claim 21 which includes a "QWERTY" keyboard key configuration having left-hand "QWERTY" keys, right-hand "QWERTY" keys and a space key, wherein
said first keyboard portion includes said left-hand "QWERTY" keys disposed on said top side;
said second keyboard portion includes said right-hand "QWERTY" keys disposed on said top side; and
one of said keyboard portions includes said space key disposed on said adjacent side surface of that keyboard portion.

23. A computer keyboard mountable on a support mechanism for operation with respect to a working surface and positionable for operation between a user's fingers and thumb, said computer keyboard comprising:
a first keyboard half portion having a front side, a back side and a generally vertical connecting edge;
said front side and said back side of said first keyboard half portion bearing at least one keyboard key;
a second keyboard half portion having a front side, a back side and a generally vertical connecting edge;
said front side of said second keyboard half portion bearing at least one keyboard key;
means for connecting said first keyboard half portion and said second keyboard half portion along said generally vertical connecting edges to provide an angled relationship between said two keyboard half portions, wherein when said keyboard halves are positioned for operation between a user's fingers and thumb, said keyboard keys on said keyboard half portions front sides are accessible to said user's fingers and said at least one keyboard key on said first keyboard half portion back side is accessible to at least one of said user's thumbs; and mounting means coupled to at least one of said keyboard half portions for mounting said keyboard half portions on said support mechanism, said mounting means including adjustable positioning means for adjustably positioning said keyboard half portions to a plurality of operating positions off of said working surface and for enabling operation of said keyboard half portions in least a selected one of said operating positions.

24. A computer keyboard mountable on a support mechanism for operation with respect to a working surface, said computer keyboard comprising:

a first keyboard portion;

said first keyboard portion having two opposing sides;

at least one of said opposing sides of said first keyboard portion having keys;

a second keyboard portion;

said second keyboard portion having two opposing sides;

at least one of said opposing sides of said second keyboard portion having keys;

connecting means interconnecting said keyboard portions for positional adjustment of said first and second keyboard portions with respect to each other; and mounting means for mounting said keyboard portions on said support mechanism, said mounting means including adjustable positioning means for adjustably positioning said keyboard portions to a plurality of operating positions off of said working surface and for enabling operation of said keyboard portions in at least a selected one of said operating positions.

25. A computer keyboard according to claim 24, wherein said connecting means includes:

first and second stackable hinges;

said first stackable hinge coupled to said first keyboard portion for positional adjustment of said first keyboard portion with respect to said second keyboard portion; and said second stackable hinge coupled to said second keyboard portion for positional adjustment of said second keyboard portion with respect to said first keyboard portion.

26. A computer keyboard according to claim 25, wherein said connecting means further includes:

first and second connecting rods;

said first connecting rod interconnecting said first keyboard portion and said first stackable hinge; and said second connecting rod interconnecting said second keyboard portion and said second stackable hinge.

27. A computer keyboard according to claim 26, wherein said connecting means further includes:

an interconnecting member interconnecting said first stackable hinge and said second stackable hinge.

28. A computer keyboard according to claim 27, wherein said mounting means includes a clamping means connected to said interconnecting member.

29. A computer keyboard according to claim 26, wherein said mounting means includes clamping means.

30. A computer keyboard according to claim 29, wherein said clamping means further interconnects said first and second stackable hinges.

31. A computer keyboard according to claim 29, wherein said clamping means includes adjustment means for positional adjustment of said keyboard with respect to said support mechanism.

* * * * *